(12) United States Patent
Wood et al.

(10) Patent No.: US 7,823,832 B2
(45) Date of Patent: Nov. 2, 2010

(54) INJECTION-MOLDED WINDOW PANEL AND RELATED METHODS

(75) Inventors: Jeffrey H Wood, Eureka, MO (US); Terry A Sewell, Ballwin, MO (US)

(73) Assignee: The Boeing Company, Chicago, IL (US)

( * ) Notice: Subject to any disclaimer, the term of this patent is extended or adjusted under 35 U.S.C. 154(b) by 1316 days.

(21) Appl. No.: 10/958,078

(22) Filed: Oct. 4, 2004

(65) Prior Publication Data

US 2006/0080914 A1    Apr. 20, 2006

(51) Int. Cl.
*B64C 1/14*    (2006.01)
*B60J 1/10*    (2006.01)

(52) U.S. Cl. .............................. 244/129.3; 296/146.15
(58) Field of Classification Search ............... 244/129.1, 244/129.3; 52/208, 204.62, 204.6; 296/84.1, 296/146.15
See application file for complete search history.

(56) References Cited

U.S. PATENT DOCUMENTS

| | | | | |
|---|---|---|---|---|
| 2,202,690 A * | 5/1940 | Fix .............................. | 29/462 |
| 2,293,656 A | 8/1942 | McClain | |
| 2,358,485 A | 9/1944 | Warren et al. | |
| 2,575,757 A * | 11/1951 | Hardy .......................... | 52/202 |
| 2,784,926 A | 3/1957 | Bonza et al. | |
| 3,429,530 A | 2/1969 | Hertel | |
| 3,843,982 A * | 10/1974 | Lane et al. ................... | 114/361 |
| 3,906,669 A * | 9/1975 | Vorguitch ..................... | 49/372 |
| 3,953,630 A | 4/1976 | Roberts et al. | |
| 4,979,342 A * | 12/1990 | Holdridge et al. ........... | 52/171.1 |
| 5,271,581 A | 12/1993 | Irish | |
| 5,339,584 A * | 8/1994 | Ohtake et al. ................. | 52/208 |
| 5,467,943 A * | 11/1995 | Umeda ..................... | 244/129.3 |
| 6,082,674 A * | 7/2000 | White et al. .............. | 244/129.3 |
| 6,168,112 B1 * | 1/2001 | Mueller et al. ............ | 244/129.3 |
| 6,561,460 B2 * | 5/2003 | Rukavina et al. ......... | 244/129.3 |
| 6,567,077 B2 * | 5/2003 | Inoue et al. ................. | 345/173 |
| 6,592,077 B2 * | 7/2003 | Uhlemann et al. ....... | 244/129.3 |

(Continued)

FOREIGN PATENT DOCUMENTS

EP    0597624 A1    5/1994

(Continued)

OTHER PUBLICATIONS

European Search Report for European Application No. EP 05 07 7258 completed Nov. 29, 2005.

(Continued)

*Primary Examiner*—Tien Dinh
*Assistant Examiner*—Joseph W Sanderson
(74) *Attorney, Agent, or Firm*—Harness, Dickey & Pierce, P.L.C.

(57) ABSTRACT

A window panel adapted for installation relative to a structure. The panel includes a single piece of generally transparent injection-molded material configured to span one or more openings in the structure. The panel has panel attachment inserts for attaching the panel relative to the structure. The inserts are embedded in the material alongside at least one edge of the panel. The panel has a curvature that essentially continues a curvature of the structure surrounding the opening(s) when the panel is installed relative to the structure. This panel can be single-pane and can provide an essentially continuous window along an aircraft fuselage.

9 Claims, 6 Drawing Sheets

U.S. PATENT DOCUMENTS

| | | | |
|---|---|---|---|
| 6,736,352 B2 * | 5/2004 | Bladt et al. | 244/129.3 |
| 6,848,655 B2 * | 2/2005 | Wood | 244/121 |
| 6,905,094 B2 * | 6/2005 | Dazet et al. | 244/129.3 |
| 6,938,858 B1 * | 9/2005 | Schneider et al. | 244/158.3 |
| 7,028,950 B2 * | 4/2006 | Salmon et al. | 244/129.3 |
| 7,118,069 B2 | 10/2006 | Novak et al. | |
| 7,143,979 B2 * | 12/2006 | Wood et al. | 244/129.3 |
| 7,188,399 B2 * | 3/2007 | Campus et al. | 29/428 |
| 2004/0238690 A1 | 12/2004 | Wood et al. | |

FOREIGN PATENT DOCUMENTS

| | | |
|---|---|---|
| EP | 1 481 892 A2 | 12/2004 |
| EP | 1481892 A2 | 12/2004 |
| JP | 2001 354781 | 12/2001 |

OTHER PUBLICATIONS

European Search Report for European Application No. 05077259.9 completed Nov. 29, 2005.

* cited by examiner

INJECTION-MOLDED WINDOW PANEL AND RELATED METHODS

CROSS-REFERENCE TO RELATED APPLICATIONS

This application is related to co-pending U.S. patent application Ser. No. 10/958,079 entitled "Apparatus and Methods For Reinforcing a Structural Panel" and co-pending U.S. patent application Ser. No. 10/958,080 entitled "Apparatus and Methods For Installing an Aircraft Window Panel", both filed on the same date as this application and assigned to the assignee of this application, the disclosures of which are incorporated herein by reference.

FIELD OF THE INVENTION

The present invention relates to window panels, and more particularly (but not exclusively) to a generally transparent window panel for use in aircraft, trains, boats, buses and other mobile or stationary structures.

BACKGROUND OF THE INVENTION

Most private and commercial aircraft have side windows that appear as small portholes along the sides of the aircraft. Each window typically includes multiple panes of acrylic and/or glass, for example, a thick outer pane separated by an air gap from a thin inner pane. The two panes are mounted in a silicon seal to maintain the air gap separation between the panes. These windows typically are mounted in a heavy support structure that limits the size and location of the windows.

SUMMARY OF THE INVENTION

The present invention, in one configuration, is directed to a window panel adapted for installation relative to a structure. The panel includes a single piece of generally transparent injection-molded material configured to span one or more openings in the structure. The panel also includes a plurality of panel attachment inserts for attaching the panel relative to the structure. The inserts are embedded in the material alongside at least one edge of the panel. The panel has a curvature configured to essentially continue a curvature of the structure surrounding the one or more openings when the panel is installed relative to the structure.

In another configuration, a window panel adapted for installation relative to a structure includes a single piece of generally transparent injection-molded material. The material has at least one edge configured to abut a support member of the structure and at least one other edge configured to abut an edge of another window panel of the structure. The panel has a curvature generally continuous with a surface curvature of the structure when the panel is installed relative to the structure.

In one implementation, the invention is directed to a method of installing an injection-molded window panel relative to a structure. One or more edges of the panel are matched to one or more openings in the structure such that a curvature of the structure is made essentially continuous by a curvature of the panel over the one or more openings. At least one fastener is installed into at least one of a plurality of panel attachment inserts embedded in the panel alongside at least one of the edges of the panel to attach the panel relative to the structure.

In another implementation, the invention is directed to a method of making a window panel for installation relative to a structure. A plurality of attachment inserts are placed in a mold. A polymeric material is injected into the mold to embed the inserts in the material alongside one or more edges of the material defined at least partly by the mold. The injected material is removed from the mold. The injecting step includes molding the material into a generally transparent panel having a shape configured to span one or more openings in the structure while generally continuing a curvature of the structure surrounding the one or more openings when the panel is installed relative to the structure.

The features, functions, and advantages can be achieved independently in various embodiments of the present inventions or may be combined in yet other embodiments.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses. For purposes of clarity, the same reference numbers may be used in the drawings to identify similar elements. Although various configurations of the present invention are described herein with reference to aircraft, the invention is not so limited. Embodiments of the invention are contemplated in connection with other types of mobile platforms, for example, trains, buses, boats and other vehicles. Configurations also are contemplated in connection with stationary structures.

Figure 1:
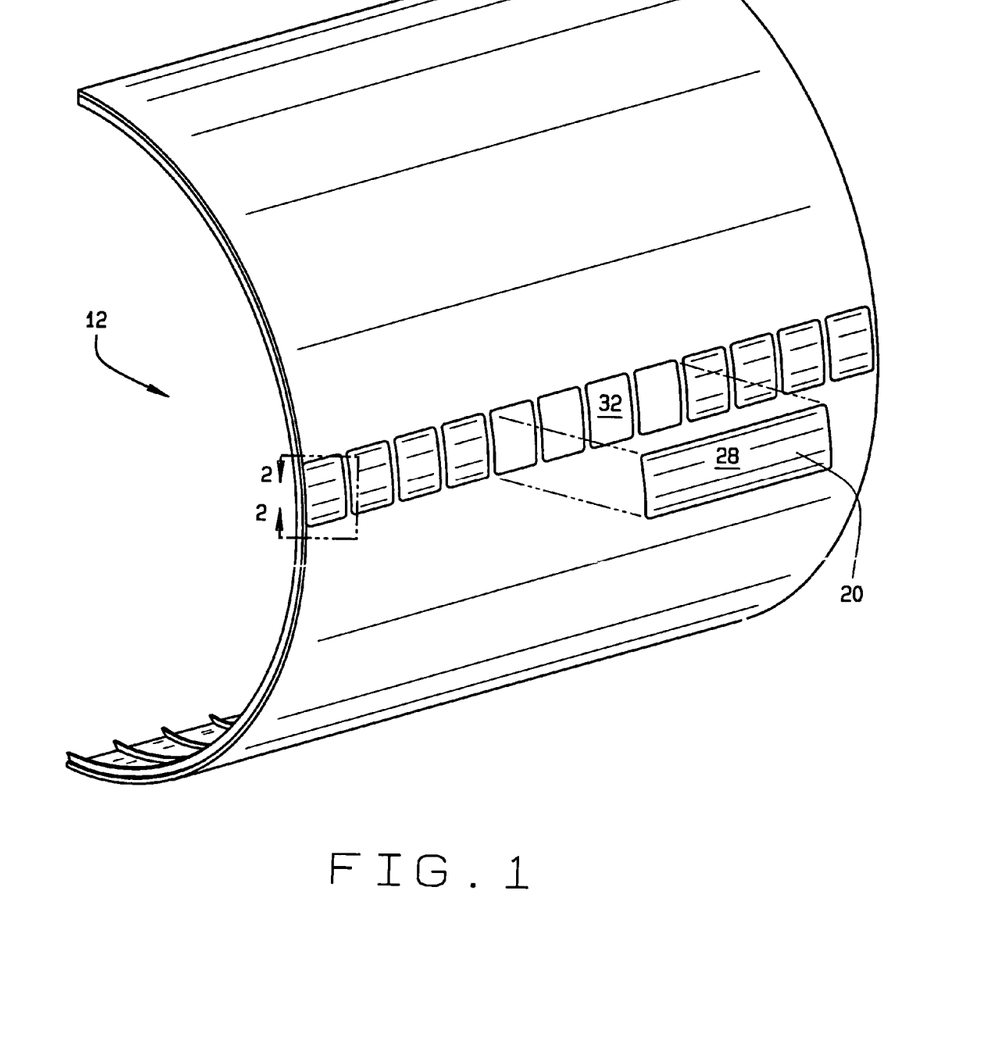
FIG. 1 is an exploded perspective view of a window panel relative to a portion of an aircraft fuselage in accordance with one configuration of the present invention.

Referring now to FIG. 1, a structure, e.g., an aircraft fuselage in accordance with one configuration of the present invention, is partially shown and indicated generally by reference number 12. An embodiment of a window panel 20 is adapted for installation relative to the fuselage 12. The panel 20 includes a single piece of generally transparent injection-molded material 28 that, when installed relative to the fuselage 12, spans one or more openings 32 in the fuselage 12. Three window panels 20 are shown in FIG. 1, each panel spanning four openings 32. It should be understood, however, that in other configurations a panel 20 could span more than four or fewer than four openings 32. Thus, for example, a panel 20 could be configured to span a single opening 32. In the present exemplary configuration, the openings 32 are defined at least partially by aircraft support members, e.g., hoop frames and longerons of the fuselage 12 as further described below. It should be noted that openings could be defined in other or additional ways in other configurations and other structures.

Figure 2:
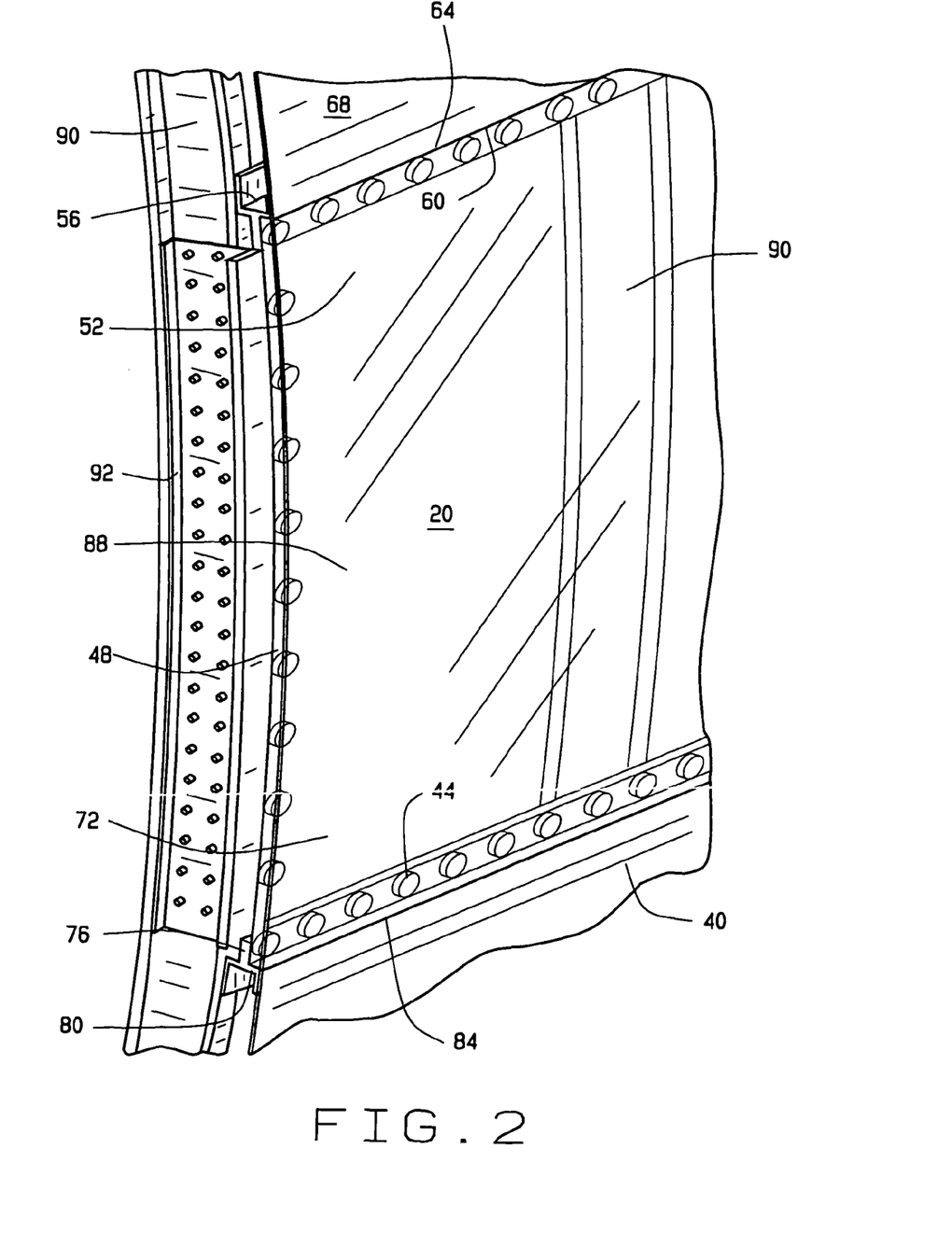
FIG. 2 is a detail on an enlarged scale taken along line 2-2 in FIG. 1.

A portion of the window panel 20 is shown in greater detail in FIG. 2. The window panel 20 has a curvature that follows one or more mold lines of the fuselage 12. In other words, the window panel 20 has a curvature that generally continues a surface curvature of the fuselage 12 surrounding the opening (s) 32 when the panel 20 is installed relative to the fuselage 12. Thus, as can be seen in FIG. 2, the window panel 20 has a convex curvature that generally continues a convex curvature of the fuselage 12. In other implementations, however, a window panel could include curved and/or flat portions that differ in curvature and/or flatness from a structure relative to which such panel is installed.

The panel 20 may be reversibly installed relative to an exterior side 40 of the fuselage 12. A plurality of panel attachment inserts 44 are embedded in the panel 20 alongside one or more panel edges, e.g., alongside one or both of two side edge(s) 48 (one of which is shown in FIG. 2), alongside an upper edge 60, and/or alongside a lower edge 80. The attachment inserts 44 may be used to attach the panel to the fuselage 12 as further described below. The attachment inserts 44 may be fabricated of metal, for example, 17-4 PH stainless steel or other suitable materials.

An upper end 52 of the panel 20 is attached via inserts 44 to an upper longeron 56 of the aircraft. The upper edge 60 of the panel abuts an edge 64 of a skin 68 of the aircraft. A lower end 72 of the panel is attached via inserts 44 to a lower longeron 76. The lower edge 80 of the panel abuts an edge 84 of the skin 68. In another configuration, one or more ends of the panel 20 could be lap-spliced to the skin 68.

At least one side end 88 of the panel 20 may be attached relative to an aircraft support member 90 via inserts 44 and, for example, via a window panel splice fitting 92. In the present configuration the panel 20 spans, but may not necessarily be attached to, one or more intervening support members 90, one of which is visible in FIG. 2 through the panel 20. It can be easily appreciated that in other configurations, a window panel in accordance with principles of the present invention may have a different shape and/or curvature to span a different opening in a different structure. Although inserts 44 and window panel splice fittings 92 are used in the present configuration to attach the window panel 20 relative to one or more support members 90, configurations also are contemplated in which other or additional types of attachment elements are used to install a window panel relative to a structure.

Figure 3:
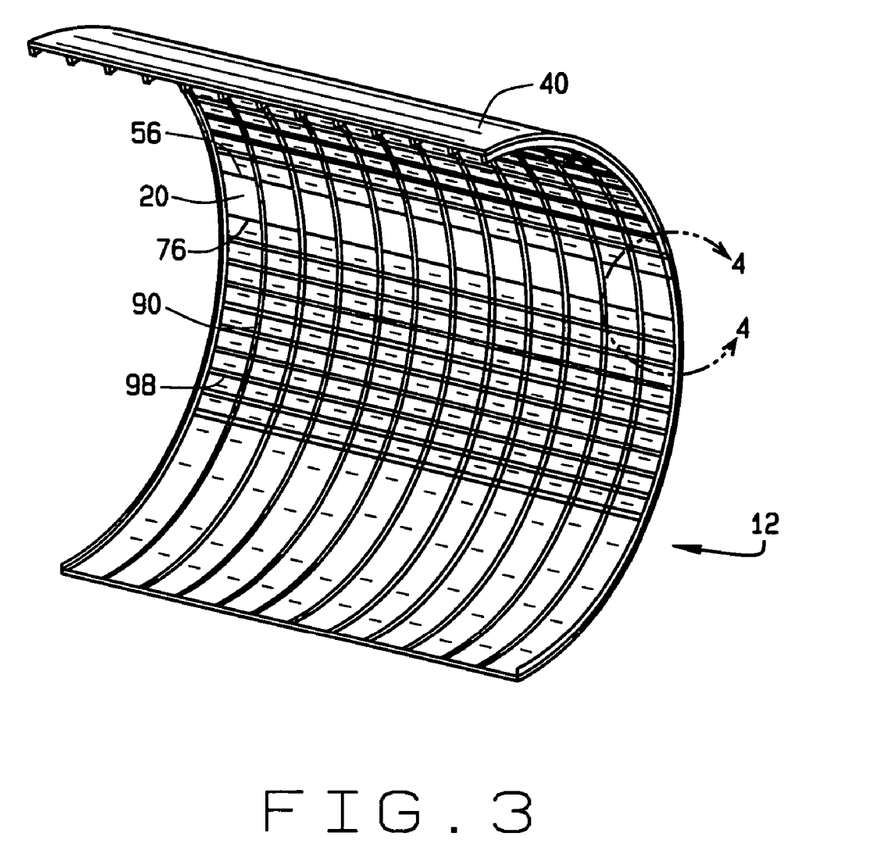
FIG. 3 is an interior perspective view of a portion of an aircraft fuselage cut away to show window panels in accordance with one configuration of the present invention.
Figure 4:
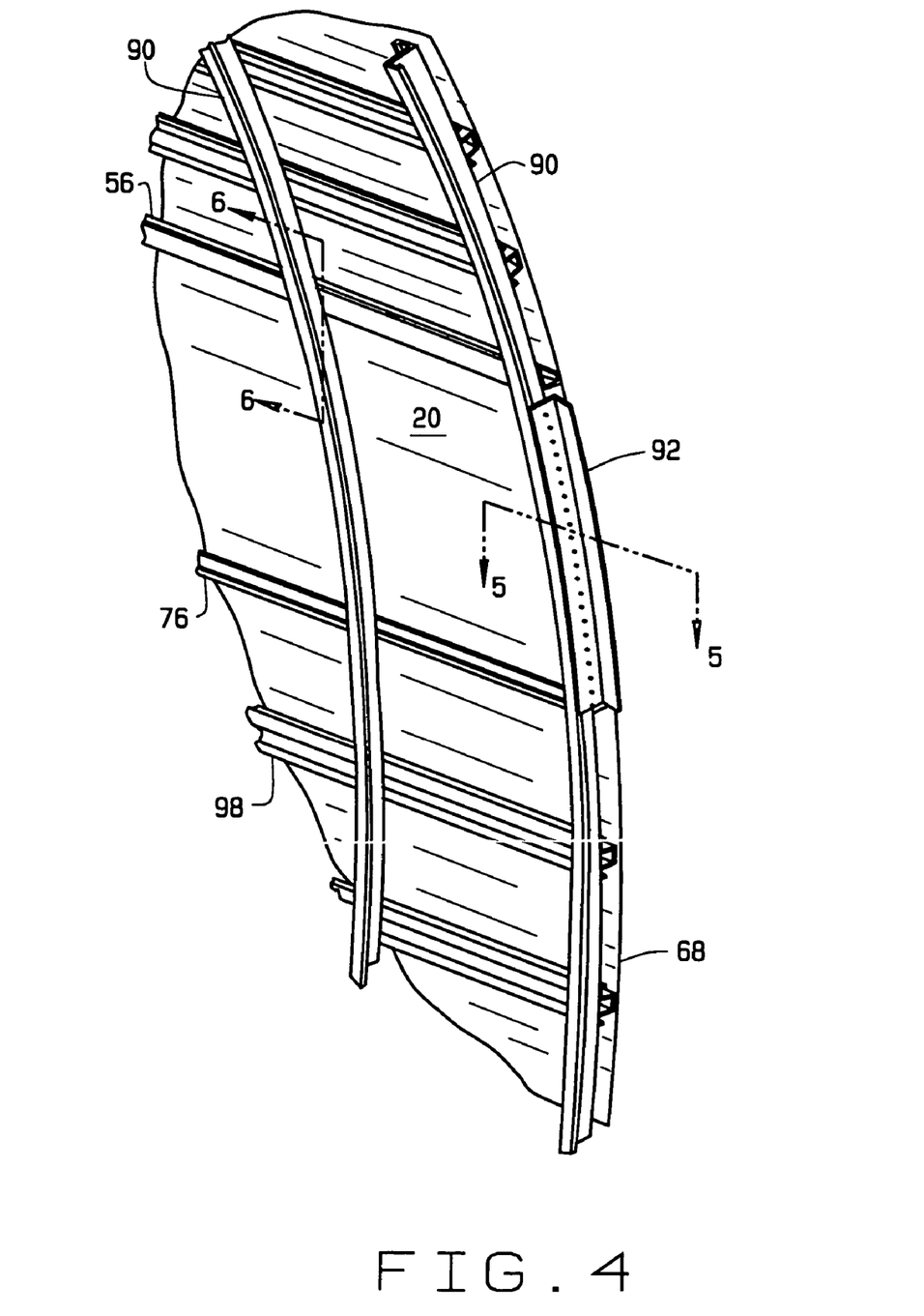
FIG. 4 is a detail on an enlarged scale taken along line 4-4 in FIG. 3.

An interior perspective view of part of the fuselage 12 is shown in FIG. 3. The fuselage 12 includes a plurality of vertically oriented hoop frame support members 90 and a plurality of horizontally oriented stringers 98. FIG. 4 is a detail of the fuselage 12 on an enlarged scale taken along line 4-4 in FIG. 3.

Figure 5:
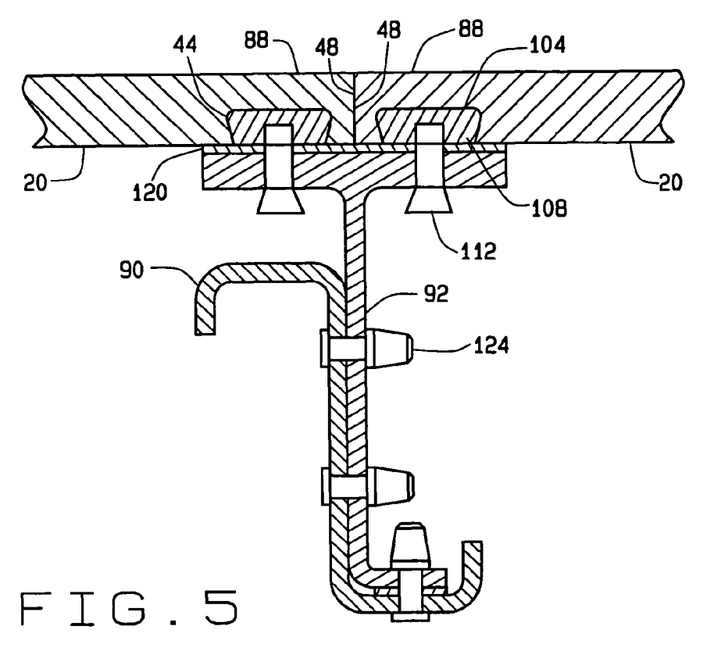
FIG. 5 is a sectional view, taken along the plane of line 5-5 in FIG. 4, of two window panel ends mounted relative to an aircraft support member in accordance with one configuration of the present invention.

FIG. 5 is a sectional view, taken along the plane of line 5-5 in FIG. 4, of two window panel side ends 88 mounted relative to a support member 90 in accordance with one configuration of the present invention. In the present configuration, each attachment insert 44 has a tapered shape, thereby providing a distal end 104 that is wider than a proximal end 108 of the insert. The proximal end 108 is positioned in the panel 20 to receive a fastener 112 for attaching the panel 20 to the fuselage 12.

The two panel side ends 88 shown in FIG. 5 are mounted such that side edges 48 of the panels 20 abut each other. A seal 120 is applied to the panel side ends 88 over the attachment inserts 44, and a window panel splice fitting 92 is placed over the seal. Alternatively, the seal 120 could be applied to the window panel splice fitting 92, and the splice fitting 92 could be placed over the attachment inserts 44. The seal 120 may be, for example, fabricated of neoprene or silicone rubber. Fasteners 112 are installed through the splice fitting 92 and seal 120 and into the attachment inserts 44. In a preferred embodiment, a fastener 112 is installed through the proximal end 108 of an attachment insert 44 without penetrating the distal end 104 of the attachment insert. The splice fitting 92 may be fastened to the support member 90 using fasteners 124.

Figure 6:
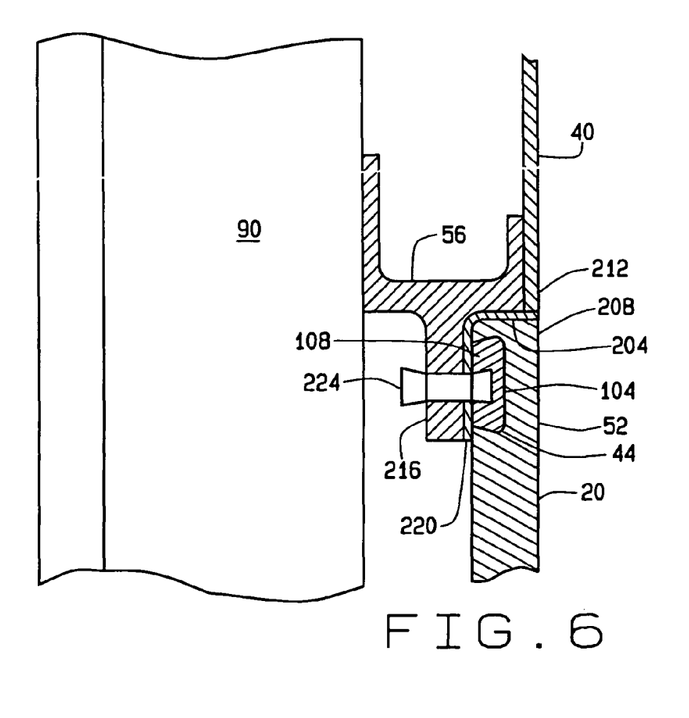
FIG. 6 is a sectional view, taken along the plane of line 6-6 in FIG. 4, of a window panel upper end mounted relative to an aircraft longeron in accordance with one configuration of the present invention.

FIG. 6 is a sectional view of part of the fuselage 12, taken along the plane of line 6-6 in FIG. 4. The window panel upper end 52 is mounted relative to the upper longeron 56 in accordance with one configuration of the present invention. The panel upper end 52 fits in a recess 204 of the longeron 56 such that an outer surface 208 of the panel end 52 is generally continuous with an outer surface 212 of the skin 40. An attachment insert 44 embedded in the panel end 52 is aligned with a spine 216 of the longeron 56.

When the window panel upper end 52 is mounted relative to the longeron 56, a seal 220 is applied between the longeron 56 and panel upper end 52, and the upper end 52 is positioned in the recess 204. The seal 220 may be, for example, fabricated of neoprene or silicone rubber. A fastener 224 is installed through the longeron spine 216 and seal 220 and into the attachment insert 44. In a preferred embodiment, the fastener 224 is installed through the proximal end 108 of the attachment insert 44 without penetrating the distal end 104 of the attachment insert.

The window panel 20 may be fabricated using a polymeric material, for example, aerospace grade polycarbonate or acrylic. Such materials may include but are not limited to Lexan® 103-polycarbonate, available from General Electric Company of Fairfield, Conn., and/or Plexiglas® HFI-acrylic, available from Atofina Chemicals, Inc. of Philadelphia, Pa. Although a window panel 20 may be fabricated from polycarbonate and/or acrylic materials, chemically resistant versions of polyurethane may be used in other configurations.

Figure 7:
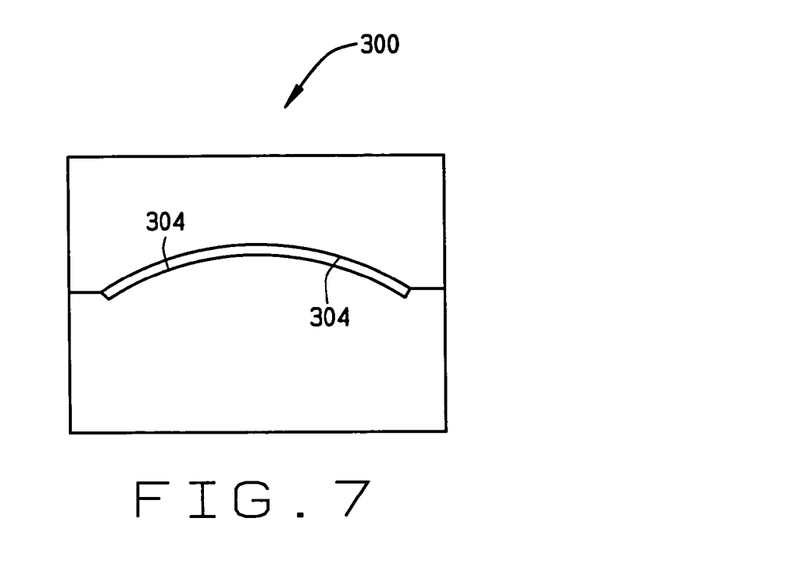
FIG. 7 is a cross-sectional view of a closed-cavity mold in accordance with one configuration of the present invention.

A closed-cavity mold is indicated generally in FIG. 7 by reference number 300. The mold 300 includes inner surfaces 304 appropriate for producing a window panel having a desirable shape and optical characteristics. The polymeric material may be injection-molded in the mold 300 under heat at about 530 F plus or minus about 20 F, and at pressure between about 1500 and 2000 psi.

Figure 8:
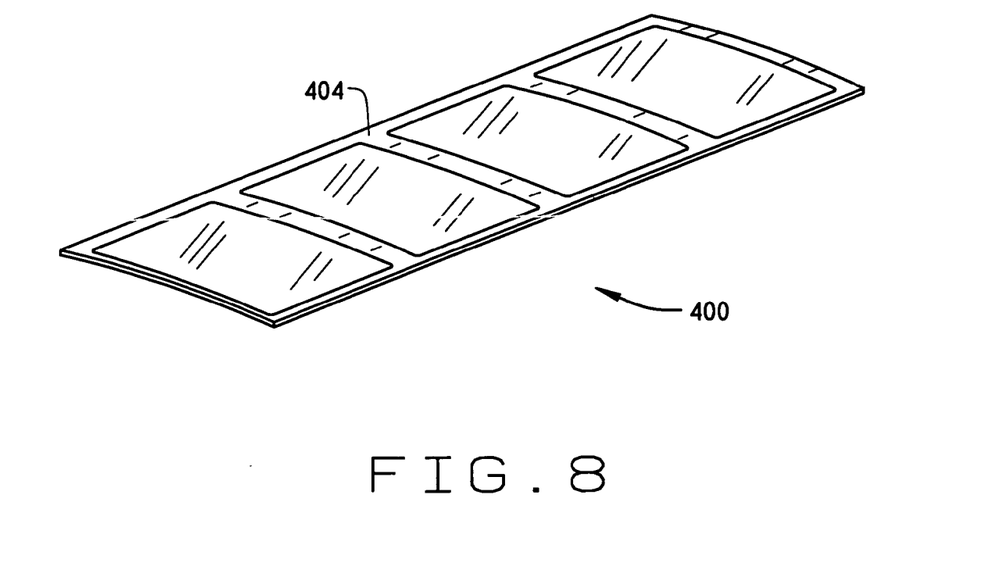
FIG. 8 is a perspective view of a window panel in accordance with one configuration of the present invention.

In one implementation, before being injected into the mold 300, the polymeric material is dried at about 250 F for about four or more hours to remove essentially all water from the material. The dried material is fed into a heated cork screw extruder set at about 530 F to melt the material and ready it for injection into the mold 300. Before the material is injected into the mold 300, attachment inserts 44 may be positioned in the mold. Alternative and/or additional elements, e.g., framing and/or strengthening elements and related attachment inserts may also be placed in the mold 300 before injection. Exemplary elements are described in co-pending U.S. patent application Ser. No. 10/958,079, the disclosure of which is incorporated herein by reference in its entirety. A configuration of a window panel fabricated in such manner is indicated generally in FIG. 8 by reference number 400. The window panel 400 includes an embedded frame 404 fabricated, for example, of aluminum and/or a composite material.

When the polymeric material has reached about 530 F, it is forced into an accumulator (not shown) that contains a pressure piston. For injection of the material, the pressure piston is actuated and applies between about 1500 and about 2000 psi pressure on a polymer shot that is forced into the closed mold 300. Once the material is injected, it may be held at between about 1500 and about 2000 psi pressure for a dwell time of approximately 20 minutes to allow for packing and cooling of the material in the mold 300. The mold may be held at about 350 F to allow for rapid polymer injection without freezing and to allow for polymer shrinkage that may take place during the cool-down packing cycle. After the packing cycle, the mold 300 is opened and the window panel is removed.

In one implementation, the window panel 20 may be installed relative to a structure such as the fuselage 12 in the following manner. Upper and lower edges 60 and 80 and one or more side edges 48 of the panel 20 are matched to an opening 32 in the structure 12 such that a curvature of the structure is made continuous by a curvature of the panel 20 over the opening 32. A plurality of fasteners 112 and/or 224 are installed into a plurality of panel attachment inserts 44 embedded alongside at least one of the edges 60, 80 and/or 48 of the panel 20 to attach the panel relative to the structure 12. It should be understood that although one type of attachment insert (i.e., the insert 44) and two types of fasteners (i.e., fasteners 112 and 224) are shown in the Figures and described herein, various types, shapes and/or sizes of inserts and/or fasteners could be used to install window panels. For example, more than one type of attachment insert could be embedded in a single panel, and/or a single type of fastener might be used to install a window panel.

Embodiments of the foregoing window panel make it possible to include larger, more contoured windows in an aircraft or other structure than was previously possible. Polycarbonate, acrylic and/or polyurethane windows of the present invention can be made to include impact-tolerant, ballistic-resistant and/or explosion-resistant properties. The foregoing window panel can be aerodynamically shaped for use in aircraft and other moving structures. The window panel can also be coated, for example, with an electrochromic coating to provide window darkening. Injection-molding large panels enables the fabrication of a series of windows in a one-shot process that significantly reduces over-all labor and cost compared to fabricating individual windows.

The foregoing configurations can provide large, low-cost, aerodynamically shaped window panels that possess structural strength and optical clarity throughout a high-curvature field of view. The foregoing window panels also are lighter in weight than the double-pane aircraft windows and window-supporting structures currently in use. Weight can be reduced by as much as forty to sixty percent when four to six windows are provided as a single panel as described herein. Window panels configured in accordance with principles of the present invention can be single-pane, do not require frames and can provide an essentially continuous window along the length of an aircraft fuselage.

While various preferred embodiments have been described, those skilled in the art will recognize modifications or variations which might be made without departing from the inventive concept. The examples illustrate the invention and are not intended to limit it. Therefore, the description and claims should be interpreted liberally with only such limitation as is necessary in view of the pertinent prior art.

What is claimed is:

1. A window panel system for use in a mobile vehicle, the panel system comprising first and second pieces of generally transparent injection-molded material each having a shape and size to span one or more openings in the mobile vehicle,
    the material of each of the first and second pieces having a surface configured to be generally continuous with an exterior surface of the mobile vehicle, the material surface having a curvature configured to generally continue a curvature of the exterior mobile vehicle surface;
    each of the first and second pieces having first and second ends configured to abut first and second support members of the mobile vehicle such that the first and second ends fit substantially flush with the exterior mobile vehicle surface;
    each of the first and second pieces having an inner surface and an outer surface;
    and each of the first and second pieces having a third end fitting substantially flush, and in abutting contact, with the third end of the other one of the first and second pieces of the window panel system of the mobile vehicle, to place the first and second pieces in a side-by-side, non-overlapping orientation, and to continue the exterior mobile vehicle surface curvature;
    a splice fitting shaped to overlay portions of the inner surfaces of the third ends of the first and second pieces, and secured adjacent to the third ends, to hold the third ends of the first and second pieces in abutting relationship with one another without protruding between the third ends;
    a seal interposed between the splice fitting and the third ends; and
    a third member secured to the splice fitting for supporting the splice fitting.

2. The window panel system of claim 1, further comprising a plurality of attachment inserts embedded in the panel alongside at least one of the edges whereby the panel may be attached relative to the structure.

3. The window panel system of claim 1, the mobile vehicle comprising an aircraft, the first support member comprising a longeron of the aircraft.

4. The window panel system of claim 3, further comprising a plurality of attachment inserts embedded in the material along at least one of the edges of the panel; wherein at least one of the inserts receives a fastener installed through the longeron.

5. The window panel system of claim 1, further comprising a frame embedded in the injection-molded material.

6. The window panel system of claim 1, wherein the mobile vehicle includes an aircraft, and wherein the panel further comprises a curvature that generally follows a curvature of a hoop frame of the aircraft.

7. The window panel system of claim 1, further comprising an electro-chromic coating.

8. An aircraft comprising the window panel system of claim 1.

9. A window panel system for use in a mobile vehicle, the panel system comprising:
    first and second pieces of generally transparent injection-molded material each having a shape and size to span one or more openings in the mobile vehicle;
    the material of each of the first and second pieces having a surface configured to be generally continuous with an exterior surface of the mobile vehicle, the material surface having a curvature configured to generally continue a curvature of the exterior mobile vehicle surface;

each of the first and second pieces having first and second ends configured to abut first and second support members of the mobile vehicle such that the first and second ends fit substantially flush with the exterior mobile vehicle surface;

each of the first and second pieces having an inner surface and an outer surface;

and each of the first and second pieces having a third end fitting substantially flush, and in abutting contact, with the third end of the other one of the first and second pieces of the window panel system of the mobile vehicle, to place the first and second pieces in a side-by-side, non-overlapping orientation, and to continue the exterior mobile vehicle surface curvature;

a splice fitting having a pair of holes and being shaped to overlay portions of only the inner surfaces of the third ends of the first and second pieces, and secured to the third ends, to hold the third ends of the first and second pieces in abutting relationship with one another without protruding between the third ends;

at least a pair of fasteners, each one of the pair of fasteners extending through an associated one of the holes in the splice fitting and into the inner surface of a respective one of the first and second pieces;

a seal interposed between the splice fitting and the third ends; and a third member secured to the splice fitting for supporting the splice fitting.

* * * * *